G. H. ROTH.
Nut-Lock.

No. 222,740.    Patented Dec. 16, 1879.

Witnesses.
Jos. P. Livermore
L. F. Connor

Inventor.
Gustav H. Roth,
by Crosby Gregory
Attys.

UNITED STATES PATENT OFFICE.

GUSTAV H. ROTH, OF BOSTON, MASSACHUSETTS.

IMPROVEMENT IN NUT-LOCKS.

Specification forming part of Letters Patent No. 222,740, dated December 16, 1879; application filed October 4, 1879.

*To all whom it may concern:*

Be it known that I, GUSTAV H. ROTH, of Boston, county of Suffolk, and State of Massachusetts, have invented an Improvement in Nut-Locks, of which the following description, in connection with the accompanying drawings, is a specification.

My invention relates to nut-locks; and it has for its object to produce a nut which shall be absolutely locked and unable to work loose when left to itself by any jarring or straining action, but may be unlocked and removed by the operator when desired without destroying it.

To apply my invention, I provide the threaded portion of the bolt upon which the nut is to be locked with one or more longitudinal grooves or key-seats, and use, in connection therewith, a washer fitting closely to the bolt and having internal projections to fit into the grooves of the bolt.

The nut to be locked is grooved in its tapped portion to correspond, when in proper position, with the key-seat of the bolt, and channels are cut in the under face of the nut, which extend radially out from the grooves in the tapped portion.

The key, which may be of ordinary round wire, of proper size to fit the key-seat, should be of soft material, as annealed iron or copper, and, when inserted in the key-seat, its end rests upon the projection from the washer, which closes the lower end of the key-seat. A few taps with a hammer upon the upper end of the key will form a head there, and at the same time the lower end of the key will be deflected by the washer, and will turn out into the channel in the under face of the nut, thus bending the key at right angles, and effectually preventing it from ever working out and freeing the nut when left to itself.

When desired to release the nut, the key may be drawn out by pinchers, the lower portion either bending back straight or breaking off.

Figure 1:
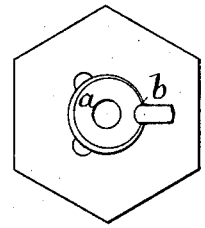
Figure 2:
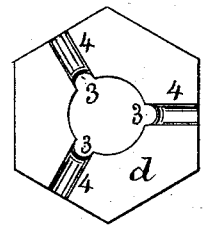
Figure 3:
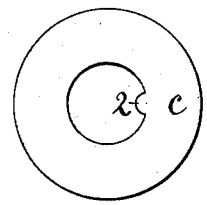
Figure 4:
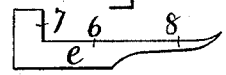

Figure 1 is an end view of a bolt and nut locked thereon in accordance with my invention; Fig. 2, an under-side view of the nut; Fig. 3, a face view of the washer; Fig. 4, a side view of the key detached; and Fig. 5, a sectional view, showing the nut locked in position.

The bolt *a* is provided with a groove or key-seat, *b*, here shown as semi-cylindrical in form. The washer *c* has an internal projection or tongue, 2, which fits the key-seat *b*, and completely closes it when in position therein.

The nut *d* is grooved in its tapped portion, as shown at 3, the grooves being shown as three in number, and the under face of the nut has channels 4, starting from the grooves 3, and extending radially across the face of the nut. The angle where the channel and groove meet is rounded off, as shown at 5, to prevent cutting the key.

The key *e*, which may be of soft wire, is, preferably, of the form shown, having a stout shank, 6, head 7, and slender point portion 8, slightly curved, as shown, toward the side on which the head is situated. The length of the shank portion of the key is a little more than the thickness of the nut, and the point portion is slightly longer than the channel in the face of the nut.

In operation, the washer is placed on the bolt, its tongue fitting the key-seat *b*, and the nut is screwed on and turned until one of its grooves corresponds in position with the key-seat *b* of the bolt. By making the grooves three in number it requires less than one-third of a turn, after the nut begins to bear, to place it in proper position, and by making two key-seats opposite one another on the bolt, less than one-sixth of a turn would be required.

Figure 5:
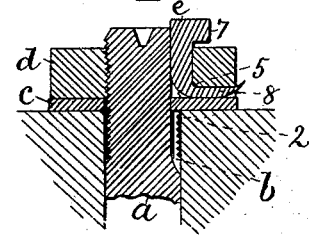

The nut being in proper position, the key is inserted, and when its point reaches the tongue of the washer it is turned aside into the channel in the face of the nut, and by driving the key it will take the form shown in Fig. 5, when it is impossible for it to rattle or work out, and the nut is securely locked.

If desired to remove the nut, the key may be drawn out with pinchers, the point portion either bending or breaking off.

A washer provided with a tongue, as described, is prevented from turning with the nut, and thereby injuring the polish of woodwork or marring a varnished surface.

I claim—

1. In a nut-lock, a bolt provided with a groove or key-seat, a washer having a tongue to fit said key-seat, and a nut provided with a groove in its tapped portion and channel in its under face, combined with a key, to operate substantially as and for the purpose described.

2. As a new article of manufacture, a nut provided with longitudinal grooves in its tapped or threaded portion, and radial channels in its lower face which meet the said grooves, substantially as described.

In testimony whereof I have signed my name to this specification in the presence of two subscribing witnesses.

GUSTAV H. ROTH.

Witnesses:
L. F. CONNOR,
JOS. P. LIVERMORE.